United States Patent
Wong et al.

(10) Patent No.: US 6,624,927 B1
(45) Date of Patent: Sep. 23, 2003

(54) RAMAN OPTICAL AMPLIFIERS

(75) Inventors: William S. Wong, San Jose, CA (US); Chien-Jen Chen, Cupertino, CA (US); G. Victor Treyz, San Carlos, CA (US)

(73) Assignee: Onetta, Inc., Sunnyvale, CA (US)

( * ) Notice: Subject to any disclaimer, the term of this patent is extended or adjusted under 35 U.S.C. 154(b) by 41 days.

(21) Appl. No.: 09/836,549

(22) Filed: Apr. 18, 2001

Related U.S. Application Data

(60) Provisional application No. 60/275,478, filed on Mar. 14, 2001.

(51) Int. Cl.$^7$ ................................................. H01S 3/00
(52) U.S. Cl. ...................................................... 359/334
(58) Field of Search ............................. 359/334, 341.3, 359/341.33

(56) References Cited

U.S. PATENT DOCUMENTS

| | | | |
|---|---|---|---|
| 4,881,790 A | | 11/1989 | Mollenauer ............... 350/96.16 |
| 5,323,404 A | * | 6/1994 | Grubb ........................... 372/6 |
| 5,596,448 A | | 1/1997 | Onaka et al. ................ 359/341 |
| 5,623,508 A | | 4/1997 | Grubb et al. ................... 372/3 |
| 5,673,280 A | | 9/1997 | Grubb et al. ................... 372/3 |
| 5,959,750 A | | 9/1999 | Eskildsen et al. ........... 359/134 |
| 6,052,393 A | | 4/2000 | Islam ............................. 372/6 |
| 6,115,174 A | | 9/2000 | Grubb et al. ................ 359/334 |
| 6,147,794 A | | 11/2000 | Stentz ......................... 359/334 |
| 6,151,160 A | | 11/2000 | Ma et al. ..................... 359/341 |
| 6,163,636 A | | 12/2000 | Stentz et al. .................. 385/24 |
| 6,178,038 B1 | | 1/2001 | Taylor et al. ................ 359/341 |
| 6,181,464 B1 | | 1/2001 | Kidorf et al. ................ 359/334 |
| 6,275,313 B1 | | 8/2001 | Denkin et al. .............. 359/124 |
| 6,407,855 B1 | * | 6/2002 | MacCormack et al. ...... 359/346 |
| 6,434,172 B1 | * | 8/2002 | DiGiovanni et al. ........... 372/6 |
| 6,452,715 B1 | * | 9/2002 | Friedrich .................... 359/334 |

FOREIGN PATENT DOCUMENTS

| | | |
|---|---|---|
| WO | WO 99/66607 | 12/1999 |
| WO | WO 00/49721 | 8/2000 |
| WO | WO 00/73849 A1 | 12/2000 |

OTHER PUBLICATIONS

Zhu et al. "1.28 Tbit/s (32 x 40 Gbit/s) Transmission over 1000 km NDSF Employing Distributed Raman Amplification and Active Gain Flattening" Electronics Letters, vol. 37, No. 1, p. 43–45 (Jan. 4, 2001).

Emori et al. "Cost–Effective Depolarization Diode Pump Unit Designed for C–band Flat Gain Raman Amplifiers to Control EDFA Gain Profile" p. 106–108.

Takeda et al. "Active Gain Tilt Equalization by Preferentially 1.43$\mu$m– or 1.48$\mu$m– Pumped Raman Amplification" OSA Optical Amplifiers and their Applications, vol. 30, p. 101–105 (1999).

Masuda "Review of Wideband Hybrid Amplifiers" 25$^{th}$ Optical Fiber Communication Conference, Technical Digest, p. 2–4, (Mar. 7, 2000).

(List continued on next page.)

*Primary Examiner*—Mark Hellner
(74) *Attorney, Agent, or Firm*—G. Victor Treyz

(57) ABSTRACT

Raman amplifier equipment for fiber-optic communications links is provided. Raman pump light at a first wavelength or wavelengths may be used to optically pump fiber in a communications link to produce Raman gain. Raman pump light at a second wavelength or wavelengths may be used to optically pump the fiber to produce Raman gain for channels at different wavelengths in the communications link. The Raman gain produced by the pump light at the first wavelength or wavelengths increases the reach of the Raman pump light at the second wavelength or wavelengths into the fiber to improve the noise figure of the amplifier.

4 Claims, 15 Drawing Sheets

OTHER PUBLICATIONS

Lewis et al. "Low–Noise High Gain Dispersion Compensating Broadband Raman Amplifier" 25$^{th}$ Optical Fiber Communication Conference, Technical Digest, p. 5–7, (Mar. 7, 2000).

Fludger et al. "Inline Loopbacks for Improved OSNR and Reduced Double Rayleigh Scattering in Distributed Raman Amplifiers" OFC.

Stentz "Progress on Raman Amplifiers" OFC '97 Technical Digest, p. 343.

Hansen et al. "Raman Amplification for Loss Compensation in Dispersion Compensating Fibre Modules" Electronics Letters, vol. 34, No. 11, p. 1136–1137, May 28, 1998.

Emori et al. "Broadband Lossless DCF using Raman Amplification Pumped by Multichannel WDM Laser Diodes" Electronics Letters, vol. 34, No. 22, Oct. 29, 1998.

Neilson et al. " 10 Gbit/s Repeaterless Transmission at 1.3 $\mu$m with 55.1–dB Power Budget using Raman Post and Preamplifier" OFC '98 Technical Digest, p. 52–53.

Stentz et al. "Raman Amplifier with Improved System Performance" OFC '96 Technical Digest, p. 16–17.

* cited by examiner

RAMAN OPTICAL AMPLIFIERS

This application claims the benefit of provisional application No. 60/275,478, filed Mar. 14, 2001.

BACKGROUND OF THE INVENTION

The present invention relates to equipment for fiber-optic communications networks, and more particularly, to optical amplifiers in which optical gain is provided by stimulated Raman scattering.

Fiber-optic networks are used to support voice and data communications. In optical networks that use wavelength division multiplexing, multiple wavelengths of light are used to support multiple communications channels on a single fiber.

Optical amplifiers such as Raman optical amplifiers and erbium-doped fiber amplifiers are used in fiber-optic networks to amplify optical signals. In a typical fiber-optic communications link, erbium-doped fiber amplifiers may be located at network nodes between successive spans of transmission fiber. The erbium-doped fiber amplifier at each node boosts the signal power of the data signals traveling along the link.

Distributed Raman amplifiers may be formed by providing backwards-propagating Raman pump light to the spans of transmission fiber. The Raman pump light produces Raman gain in the transmission fiber through stimulated Raman scattering. The Raman gain amplifies the signals traveling along the span before the signals reach the erbium-doped fiber amplifiers at the nodes.

It is an object of the present invention to provide improved Raman amplifier equipment for fiber-optic communications networks.

SUMMARY OF THE INVENTION

This and other objects of the invention are accomplished in accordance with the present invention by providing Raman optical amplifier equipment that creates Raman amplification for optical data signals being carried on fiber links in fiber-optic communications networks. Distributed Raman amplifiers and discrete Raman amplifiers may be used to provide Raman amplification. The Raman amplifiers may be used in conjunction with other types of amplifiers such as rare-earth-doped fiber amplifiers or semiconductor optical amplifiers.

Raman amplification may be provided by pumping transmission fiber spans or coils of fiber using a cascaded Raman amplifier approach. Pump light at a first wavelength or band of wavelengths may be used to generate Raman gain for light at a second wavelength or band of wavelengths. The light at the second wavelength or wavelengths may be used to produce Raman gain in the signal band. This approach may be used to extend the Raman gain in the signal band farther into the Raman-pumped fiber than would be possible without the assistance of the pump light at the first wavelength or wavelengths. Moving the Raman gain farther into the fiber may help to improve the noise figure of the amplifier.

Raman gain transients may be controlled by monitoring fluctuations in the signal light and adjusting the Raman pump power accordingly. For example, the total power of the signals on a link or the power of the signals being carried on a particular channel or channels such as a telemetry channel may be monitored. The power of the Raman pump light may be adjusted in real time based on these signal measurements to ensure that the Raman gain in the signal band remains at a desired level.

Further features of the invention and its nature and various advantages will be more apparent from the accompanying drawings and the following detailed description of the preferred embodiments.

DETAILED DESCRIPTION OF THE PREFERRED EMBODIMENTS

The Raman amplifiers of the present invention may be used as stand-alone equipment or may be incorporated into other equipment such as erbium-doped fiber amplifiers or other optical amplifiers, transmitters, receivers, add/drop modules, dispersion compensation modules, and optical switches. For illustrative purposes, aspects of the present invention are sometimes described in the context of stand-alone Raman amplifiers, but this is merely illustrative.

Figure 1:
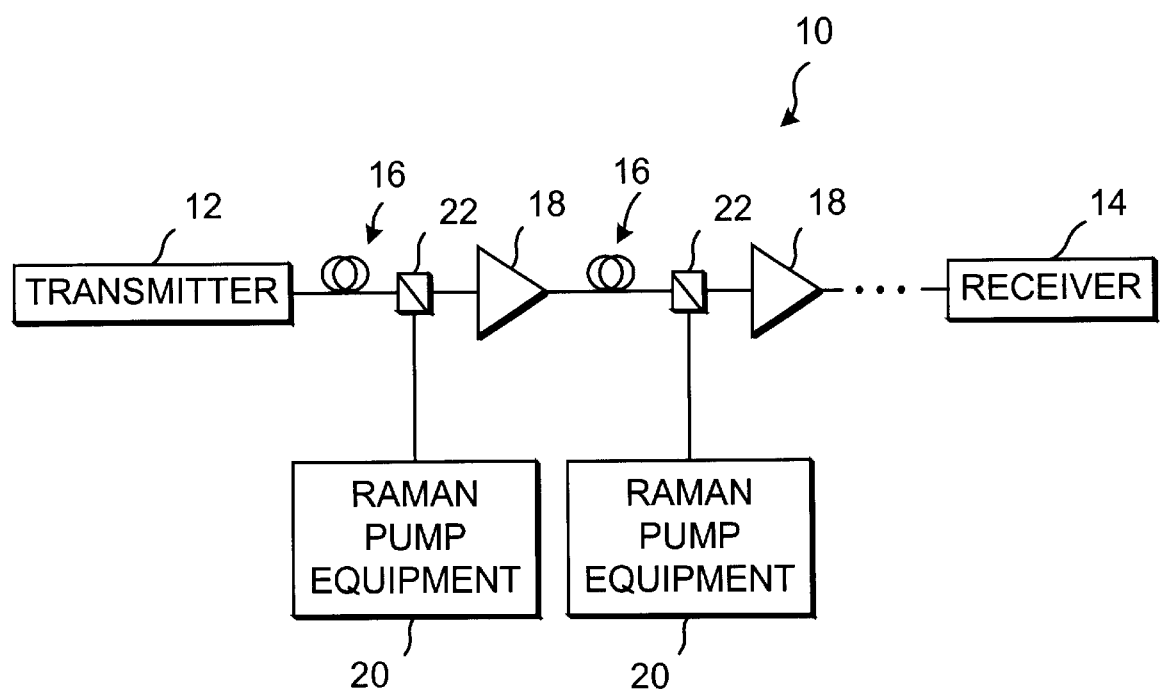
FIG. 1 is a schematic diagram of an illustrative fiber-optic communications link including optical amplifier equipment in accordance with the present invention.

An illustrative fiber-optic communications link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans 16 may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely 1illustrative system characteristics. If desired, more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., wavelengths in the range of 1240–1650 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Distributed Raman gain may be provided using Raman pump equipment 20 to launch Raman pump light into transmission fiber spans 16 through pump couplers 22. Pump couplers 22 may be wavelength-division-multiplexing couplers or any other suitable pump couplers such as couplers based on circulators.

Link 10 may include other optical network equipment such as add/drop modules, optical switches, dispersion compensation modules, dynamic filter modules, or any other suitable optical network equipment.

The Raman pumping arrangements of the present invention may be used to pump any suitable optical fiber such as optical fiber in spans 16, fiber in amplifiers 18, or fiber in other optical network equipment such as add/drop modules, optical switches, dispersion compensation By modules, dynamic filter modules, or other suitable optical network equipment.

The fiber in the Raman amplifiers and other equipment may be copumped or counterpumped or may be both copumped and counterpumped. For clarity, the present discussion will focus on counterpumped arrangements. This is, however, merely illustrative.

In a conventional counterpumped distributed Raman amplifier arrangement, Raman pump light is launched into a transmission fiber span such as span 16 in the backwards direction. The Raman pump light creates Raman gain in the span due to stimulated Raman scattering. The Raman gain in the span helps to counteract the attenuation of the signals traveling along the span in the forwards direction. Because the Raman gain occurs earlier in the span than the lumped gain at amplifier 18, the distributed Raman approach tends to improve the noise figure performance of the link. However, the distance that the Raman pump light reaches into the transmission fiber in the backwards direction is limited by fiber losses and by the conversion of pump power to signal band gain.

In accordance with the present invention, the distance that the Raman pump light reaches into the transmission fiber (or into a discrete coil of fiber) may be extended by Raman-pumping the Raman pump light itself.

Figure 2:
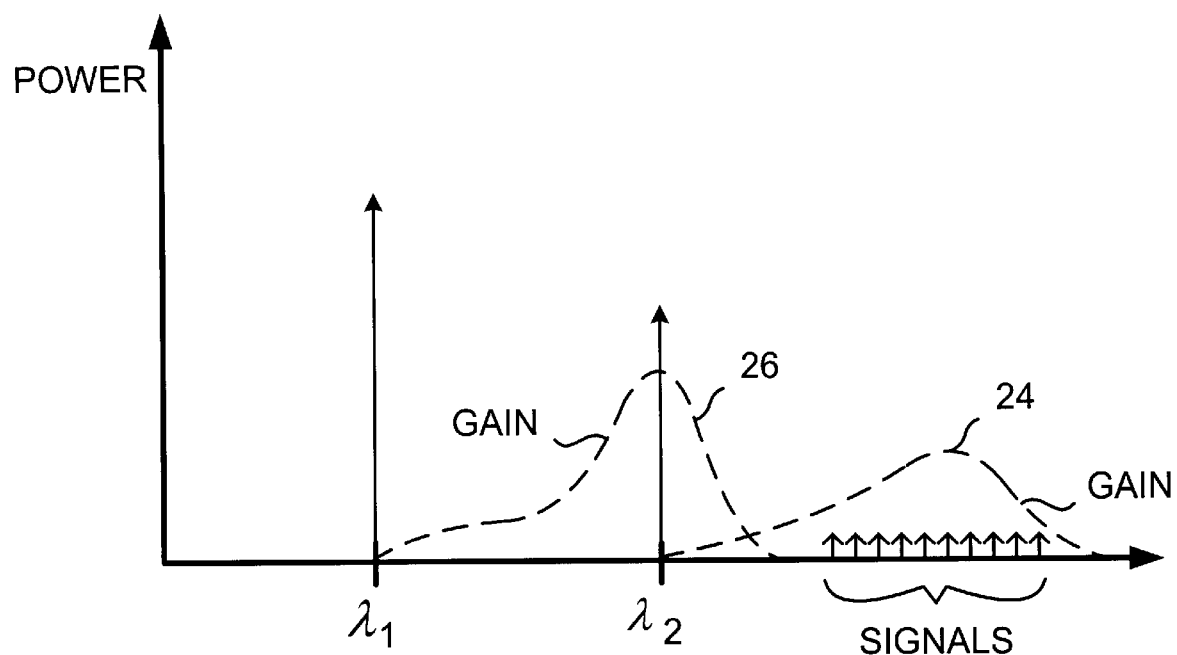
FIG. 2 is a graph showing how the fiber in a Raman amplifier may be pumped with light at a first wavelength and a second wavelength in accordance with the present invention.

A graph that illustrates this approach is shown in FIG. 2. Raman pump light at a wavelength of $\lambda_2$ is used to produce Raman gain spectrum 24. The wavelength $\lambda_2$ may be located about one Stokes shift below the signal band (i.e., about 13 THz or 50–100 nm below the signal band depending on wavelength). The peak of gain spectrum 24 may therefore be used to amplify the signals in the signal band, as shown in FIG. 2. Raman pump light at a wavelength of $\lambda_1$ is used to produce Raman gain spectrum 26. The wavelength $\lambda_1$ may be located about one Stokes shift below the wavelength $\lambda_2$. With this arrangement, the gain peak of Raman gain spectrum 26 may be aligned with the Raman pump light at $\lambda_2$.

Figure 3:
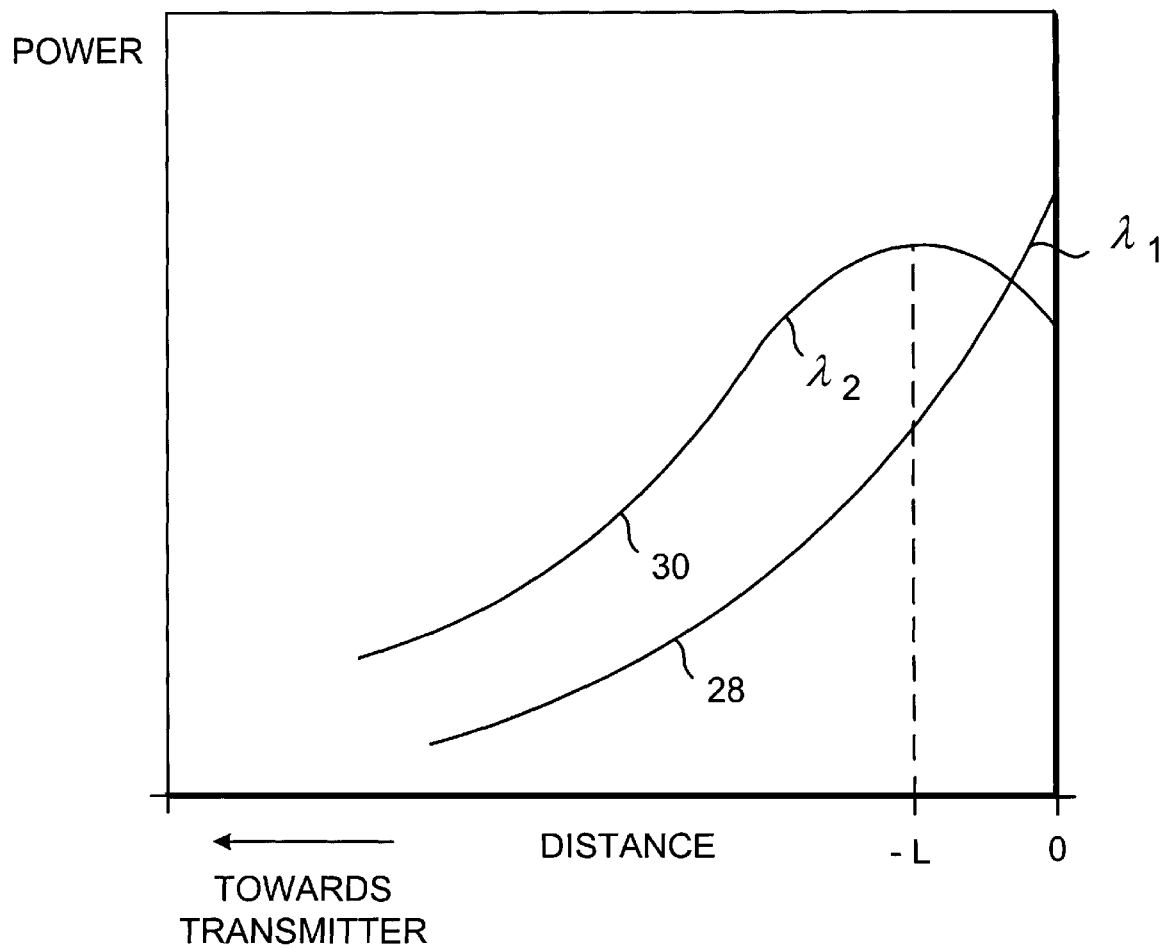
FIG. 3 is a graph showing how Raman pump light at the first wavelength extends the distance that Raman pump light at the second wavelength propagates into a fiber in accordance with the present invention.

As shown by line 28 in the graph of FIG. 3, the power of the Raman pump light at $\lambda_1$ decreases as the Raman pump light propagates along the fiber. The pump power from the pump light at $\lambda_1$ produces Raman gain for the. Raman pump at $\lambda_2$. As a result, the power of the Raman pump at $\lambda_2$ may initially increase (between 0 and −L) before decreasing (after −L), as shown by line 30. Even if the Raman pump does not increase significantly, the pump power at $\lambda_1$ helps to ensure that the Raman pump at $\lambda_2$ will not decrease as fast as it would otherwise decrease in the absence of the pump at $\lambda_1$.

As explained by the well-known noise figure cascading rules, a communications link configuration in which a gain element is placed before a loss element will generally exhibit better noise figure performance than a configuration in which the same gain and loss elements are reversed to that the loss element is positioned before the gain element. Accordingly, when the Raman pumping of the Raman pump light at $\lambda_2$ extends the distance that the Raman pump light at $\lambda_2$ penetrates into the fiber, this improves the noise figure of the Raman amplifier. The noise figure of the amplifier improves because moving Raman gain farther into the fiber amplifies the signal light (or at least decreases the amount of attenuation experienced by the signal light) before the signal light has been degraded by attenuation.

The two-wavelength arrangement of FIGS. 2 and 3 is merely illustrative. If desired, wavelengths $\lambda_1$ and $\lambda_2$ may be located different distances from each other, additional wavelengths may be used for Raman pumping in the vicinity of either $\lambda_1$ or $\lambda_2$ or both, broadband sources may be used in place of or in addition to light at one or more of these wavelengths, and additional orders of Raman pumps (i.e., pumps located one or more Stokes shifts below $\lambda_1$) may be used to extend the reach of the pump light at $\lambda_1$ even farther along the fiber by pumping the pump operating at $\lambda_2$.

Figure 4:
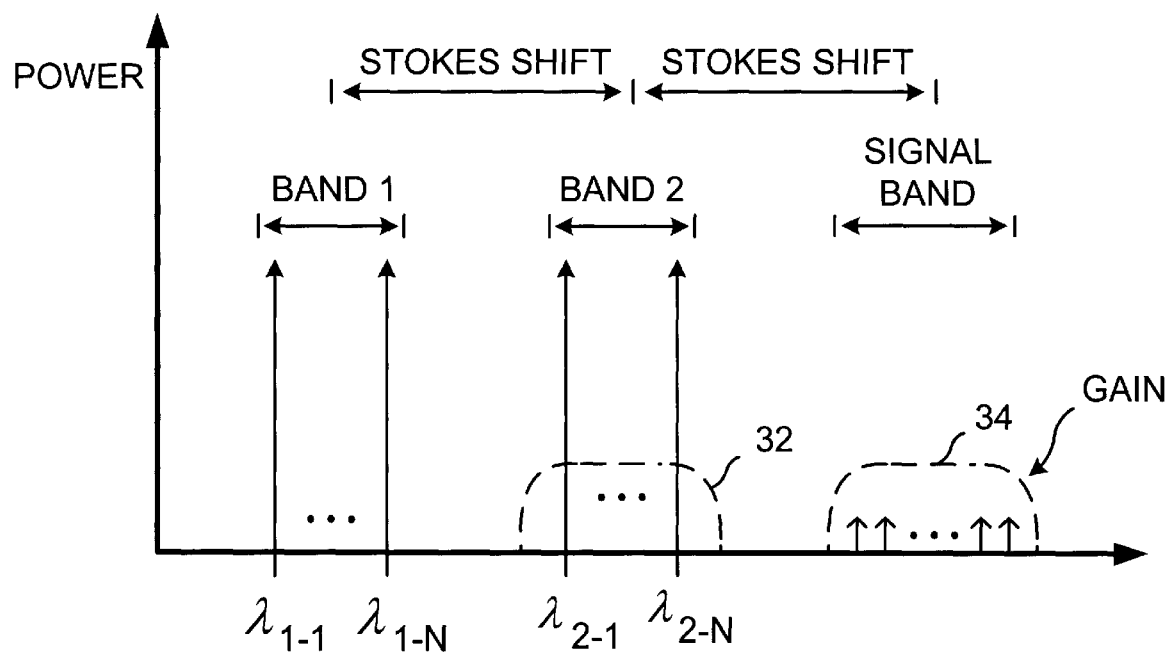
FIG. 4 is a graph showing how fiber in the Raman amplifier may be pumped with light at a first set of wavelengths and a second set of wavelengths in accordance with the present invention.

A graph illustrating a Raman pumping arrangement in which multiple bands of pump wavelengths are used is shown in FIG. 4. The pump wavelengths $\lambda_{1\text{-}1}$ to $\lambda_{1\text{-}N}$ in a first wavelength band (band 1) create Raman gain for the pump wavelengths $\lambda_{2-1}$ to $\lambda_{2-N}$ in a second band of wavelengths (band 2), as shown by gain curve 32. The band 2 pumps create Raman gain in the signal band, as shown by gain curve 34. The distance that the band 2 pumps reach into the fiber is extended by the Raman pumping of the band 1 pumps, as explained in connection with FIGS. 2 and 3. Because there are multiple pump wavelengths available in bands 1 and 2, the relative powers of the pumps and the wavelengths of the pumps may be selected to produce gain spectra 32 and 34 that have desired shapes. For example, the wavelengths and relative powers of the band 1 pumps may be selected to make the gain of curve 32 relatively flat and the wavelengths and relative powers of the band 2 pumps may be selected to it make the gain of curve 34 relatively flat.

Band 1 and band 2 may be separated by about a Stokes shift to maximize Raman pumping efficiency. Similarly, band 2 and the signal band may be separated by about a Stokes shift to maximize Raman pumping efficiency.

Any suitable number of pumps may be used in bands 1 and 2. For example, band 1 may have one, two, three, four, five, or more pumps wavelengths. Band 2 may also have one, two, three, four, five, or more pump wavelengths. The signal band may include any suitable number of data signals (e.g., 40 channels at different wavelengths, 160 channels at different wavelengths, or more channels or fewer channels).

Figure 5:
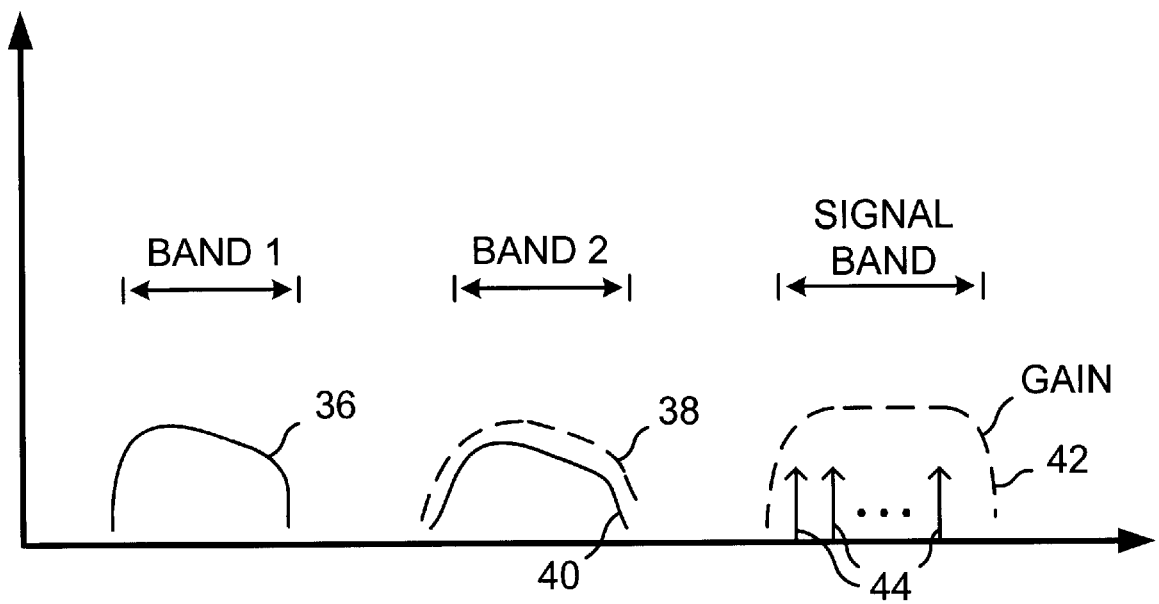
FIG. 5 is a graph showing how fiber in a Raman amplifier may be pumped with broadband light in a first wavelength band and broadband light in a second wavelength band in accordance with the present invention.

If desired, the pump light in band 1 and band 2 may be broadband light (e.g., a continuous spectrum of light), as shown in FIG. 5. Broadband light in band 1 (spectrum 36) may be used to create gain spectrum 38 through stimulated Raman scattering. Raman gain spectrum 38 may be used to amplify broadband light in band 2 (spectrum 40) to extend the reach of the band 2 pump light into the pumped fiber. The light in band 2 may be used to create Raman gain spectrum 42 in the signal band to amplify forwards-propagating data signals 44.

The arrangements of FIGS. 2–5 may be combined in any suitable fashion. For example, the shortest wavelength band of pumps may include a single pump wavelength, multiple pump wavelengths, a broadband spectrum of pump light, or a combination of these pump arrangements. Regardless of the pumping scheme used for the shorter set of wavelengths, the longest wavelength band of pumps may include a single pump wavelength, multiple pump wavelengths, a broadband spectrum of pump light, or a combination of these pump arrangements.

Figure 6:
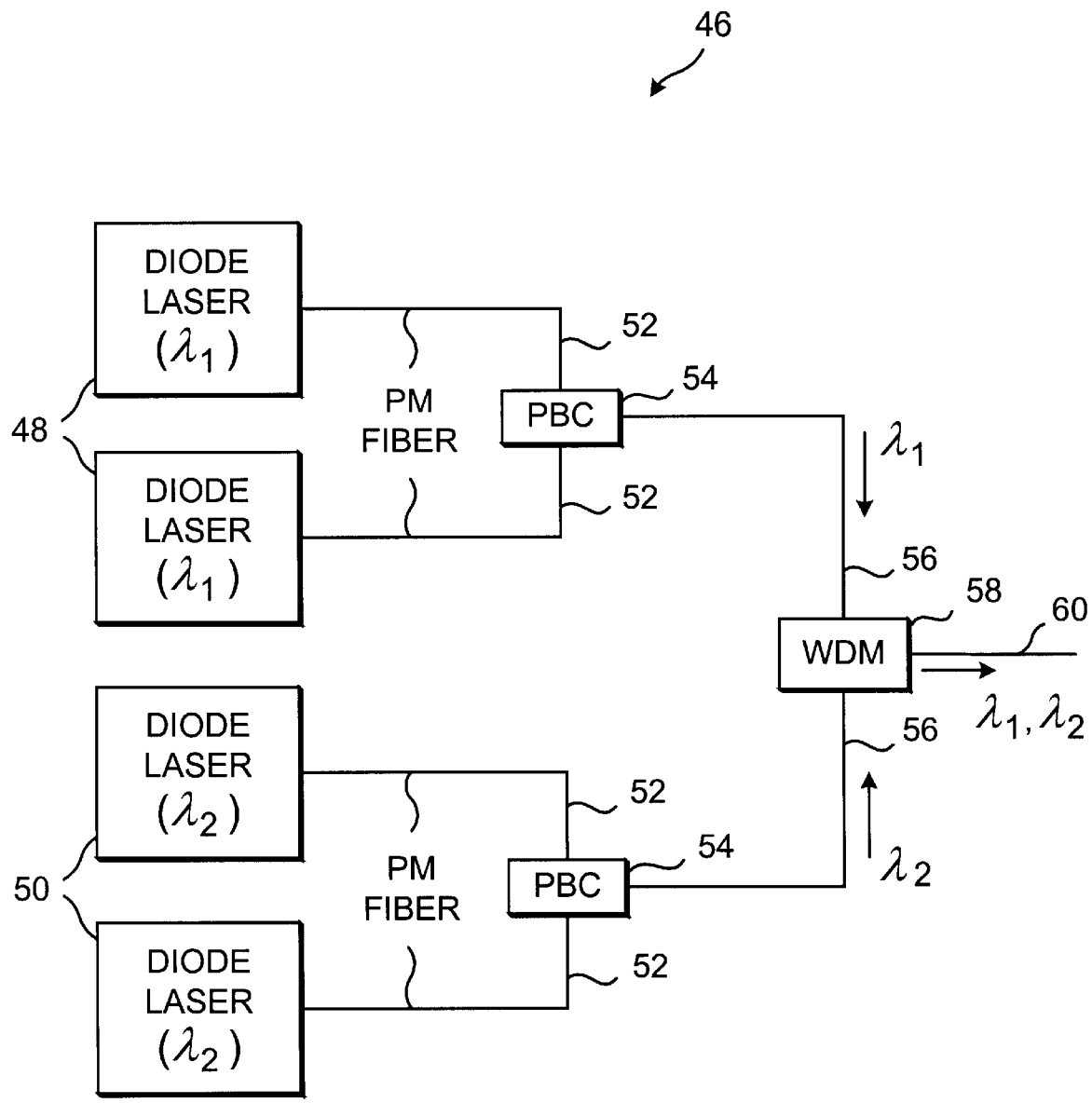
FIG. 6 is a schematic diagram of an illustrative Raman pump for proving Raman pump light at first and second wavelengths in accordance with the present invention.

An illustrative Raman pump that may be used to produce pump light at two pump wavelengths (e.g., the pump wavelengths $\lambda_1$ and $\lambda_2$ in FIGS. 2 and 3) is shown in FIG. 6. Diode laser sources 48 may be used to produce pump light at $\lambda_1$. Diode laser sources 50 may be used to produce pump light at $\lambda_2$. Each diode laser 48 and 50 may be a semiconductor laser having a fiber pigtail formed of polarization maintaining fiber 52. The polarization-maintaining fiber 52 may be coupled to polarization beam combiners 54. Polarization beam combiners 54 may be used to combine the linearly polarized light that is provided to their inputs to produce unpolarized light at single mode fiber outputs 56.

Unpolarized light may be preferred to polarized light in Raman pumping arrangements, because Raman gain tends to be polarization sensitive. Unpolarized pump light may help to reduce polarization sensitivity in the Raman gain produced for the data signals. The unpolarized light at the wavelengths $\lambda_1$ and $\lambda_2$ on fiber 56 may be combined using wavelength-division-multiplexing coupler 58. The output of coupler 58 may be provided to fiber output 60 of pump 46.

The Raman pump light provided at the output of pump 46 may be used to pump fiber such as transmission, fiber in a span 16 or one or more discrete coils of fiber.

Figure 7:
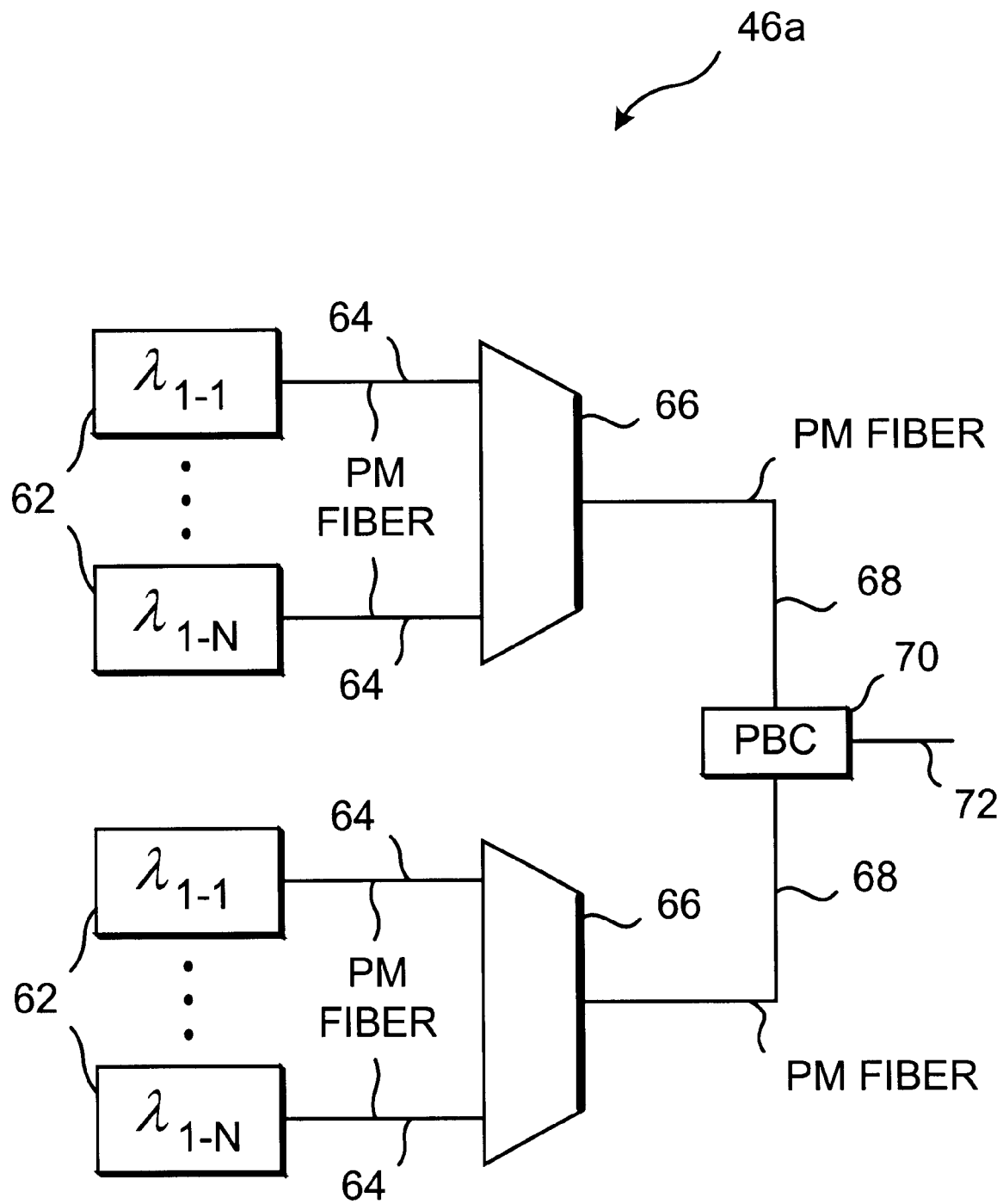
FIG. 7 is a schematic diagram of illustrative Raman pump components for providing Raman pump light at a set of wavelengths in accordance with the present invention.

A Raman pump arrangement that may be used to generate light at a set of pump wavelengths is shown in FIG. 7. Semiconductor diode laser sources 62 may produce light at wavelengths $\lambda_{1-1}$ to $\lambda_{1-N}$. Lengths of polarization-maintaining fiber 64 and optical multiplexers 66 may be used to combine the light from sources 62 onto polarization-maintaining fiber 68. Multiplexers 66 may be, for example, arrayed waveguide (AWG) devices or any other suitable devices for combining light at multiple wavelengths. The light on each of fibers 68 may be linearly polarized. Polarization beam combiner 70 may be used to combine the light from each of fibers 68 that is provided at the inputs of combiner 70 and to provide the combined light to fiber output 72. Fibers 68 may be connected to polarization beam combiner 70 at orthogonal polarization orientations, so that the output of combiner 70 is unpolarized.

The pump equipment 46a of FIG. 7 represents one-half of the pump equipment that may be used to generate two bands of pump wavelengths. The same type of configuration may be used to combine a second set of pump wavelengths $\lambda_{2-1}$ to $\lambda_{2-N}$ onto a single fiber. Each set of wavelengths ($\lambda_{1-1}$ to $\lambda_{1-N}$ and $\lambda_{2-1}$ to $\lambda_{2-N}$) may then be combined onto a single fiber by connecting output 72 of FIG. 7 and the corresponding output from the second set of sources to a wavelength-division-multiplexing coupler. The combined output from the wavelength-division-multiplexing coupler may be used as Raman pump light in a multiwavelength two-band arrangement such as the arrangement of FIG. 4.

Figure 8:
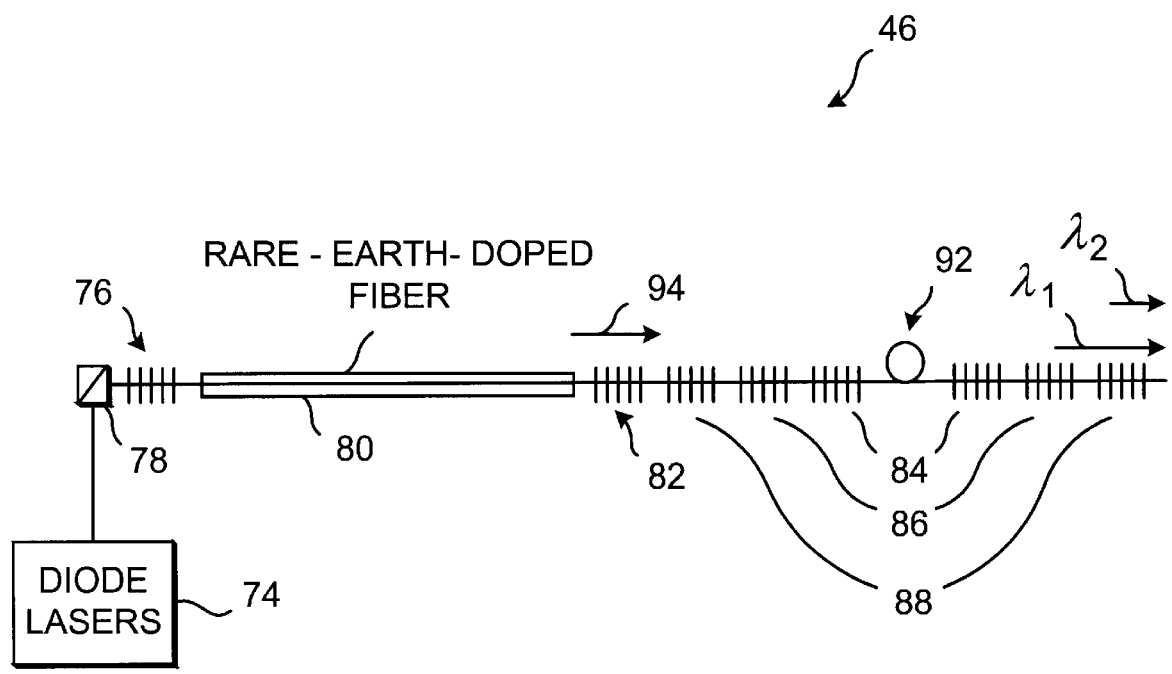
FIG. 8 is a schematic diagram of an illustrative Raman pump based on a fiber-laser-pumped cascaded Raman resonator in accordance with the present invention.

A Raman pump 46 that is based on a cascaded Raman resonator arrangement is shown in FIG. 8. A rare-earth-doped fiber such as a Ytterbium-doped fiber 80 may be optically pumped using diode lasers 74. Diode lasers 74 may be single mode or multimode semiconductor diode lasers operating at wavelengths in the range of about 910 nm to 980 nm or other suitable pump wavelengths.

Pump coupler 78 may be used to couple pump light into rare-earth-doped fiber 80 from diode lasers 74. Any suitable pump coupling arrangement may be used for pump coupler 78. For example, pump coupler 78 may be based on a tapered fiber bundle. The fibers provided at the input of the fiber bundle may include multimode fibers connected to laser diodes 74. The output of the tapered fiber bundle may use a multimode fiber that is connected to a double-clad fiber 80. The multimode fiber may be double-clad fiber or standard multimode fiber. This arrangement allows fiber 80 to be cladding pumped. As the pump light travels along the length of fiber 80, the pump light passes from the cladding through the Ytterbium-doped core of fiber 80 and creates optical gain. Reflector 76 may be a fiber Bragg grating formed on fiber 80, formed on the multimode fiber that is connected to fiber 80, or formed on another suitable length of fiber.

Another suitable pumping arrangement involves pumping fiber 80 through a notch cut in fiber 80 or a notch cut in a length of double-clad fiber that is coupled to fiber 80. With this type of configuration, reflector 76 may be formed in the length of double-clad fiber that has the notch or on another length of double-clad fiber. Wavelength-division-multiplexing couplers or coupling arrangements based on circulators may also be used. Configurations of these type may be used, for example, when pump light for fiber 80 is provided using single mode fiber.

If desired, reflector 76 may be formed on single mode fiber coupled to the leftmost end of fiber 80.

Reflectors 76 and 82 form a resonator surrounding optically-pumped fiber 80 that defines the lasing wavelength for fiber 80. Reflector 82 may be partially reflective, so that laser light from fiber 80 is emitted in the forward direction 94 towards Raman fiber 92. The light emitted from fiber 80 may, for example, be light at a wavelength of approximately 1100 nm.

Fiber 92 may be surrounded by cascaded Raman resonators 84, 86, and 88. Fiber 92 may be dispersion-compensating fiber or other small-core-area fiber or any other suitable fiber. Light from the rare-earth-doped fiber laser passes through the leftmost reflector in resonator 88, the leftmost reflector in resonator 86, and the leftmost reflector in resonator 84 and creates Raman gain in fiber 92.

Resonators 84, 86, and 88 may be configured to reflect light at fairly discrete wavelengths. When pump light from fiber 80 pumps fiber 92, Raman gain is produced in fiber 92 in a wavelength range that is approximately 50–100 nm longer than the wavelength of the pump light (when the pump light is at approximately 1100 nm). This wavelength shift between the pump wavelength and the Raman gain spectrum corresponds to a frequency shift of about 13 THz and is sometimes referred to as a Stokes shift.

The resonator formed from reflectors 84 is configured to reflect light at a particular wavelength within this Raman gain spectrum (e.g., near the peak of this Raman gain spectrum). The Raman gain at this wavelength and the reflectivities of the reflectors in resonator 84 cause light (e.g., light from spontaneous emissions in fiber 92 or quantum noise) at this wavelength to be amplified and to pass repeatedly through fiber 92.

The light that resonates between the reflectors of resonator 84 produces another shifted Raman gain spectrum in fiber 92. Resonator 86 causes light to resonate at a particular wavelength ($\lambda_1$) within this spectrum. The rightmost reflector in resonator 86 may be configured to be partially reflective at $\lambda_1$, so that a portion of the light at $\lambda_1$ is emitted from resonator 86 in the forward direction, as shown in FIG. 8.

The light that resonates within resonator 86 produces yet another Raman gain spectrum in fiber 92. Resonator 88 causes light to resonate at a particular wavelength within this spectrum ($\lambda_2$). The rightmost reflector in resonator 88 may be configured to be partially reflective at $\lambda_2$, so that a portion of the light at $\lambda_2$ is emitted from resonator 88 in the forward direction with the light at $\lambda_1$. The light at the wavelengths of $\lambda_1$ and $\lambda_2$ may be used as Raman pump light as described in connection with FIG. 2.

In the example of FIG. 8, there are three cascaded resonators, each of which produces a Raman shift of about 50–100 nm (about 13 THz or one Stokes shift). This is, however, merely illustrative. Any suitable number of resonators may be used if desired. Moreover, different placements may be used for the reflectors used to form the resonators if desired. As one example, fiber 80 may be placed between the leftmost reflector in resonator 88 and the leftmost reflector in resonator 86, etc. If desired, multiwavelength pump schemes may be supported by using resonators that resonate at more than one wavelength within the Raman gain spectrum in fiber 92.

Figure 9:
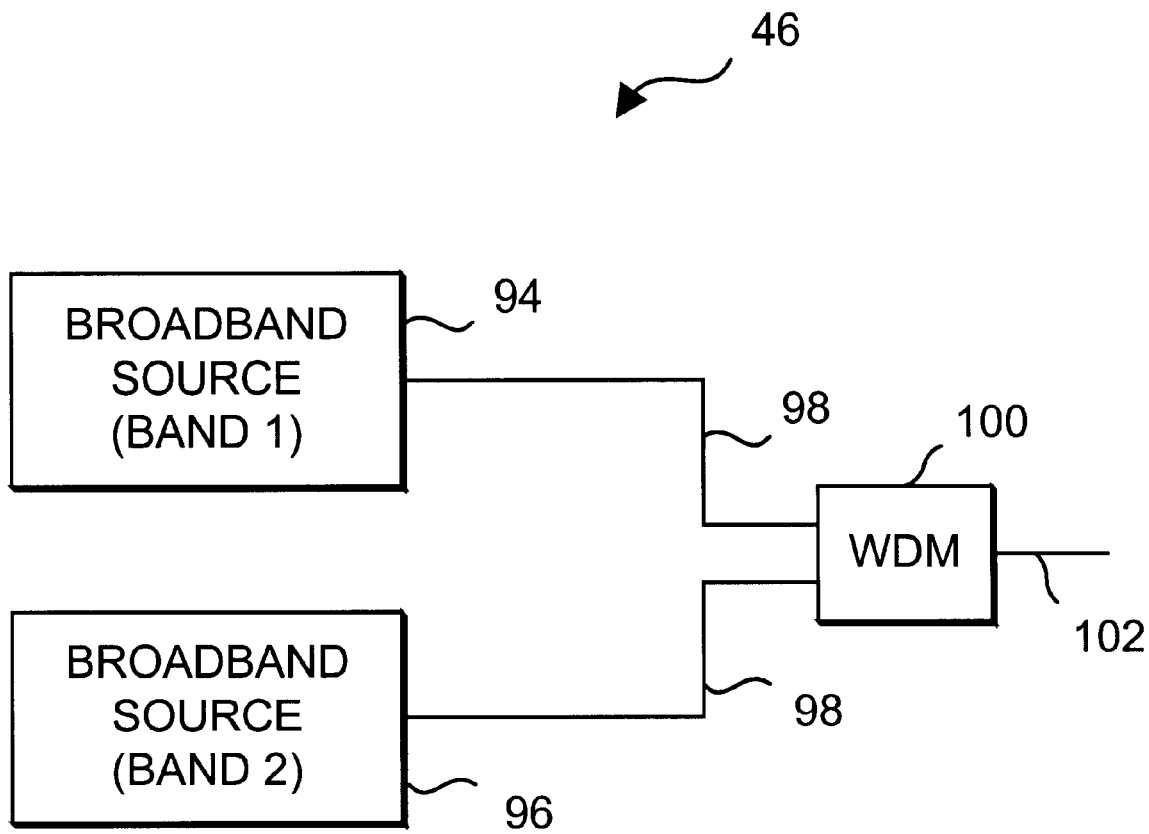
FIG. 9 is a schematic diagram of an illustrative Raman pump based on broadband sources in accordance with the present invention.

An illustrative Raman pump 46 that may be used to produce broadband Raman pump light is shown in FIG. 9. Pump 46 may have broadband sources 94 and 96. Sources 94 and 96 may be based on light-emitting diodes, spontaneous emission fiber sources, broadband lasers, or any other suitable sources of broadband light. The light from source 94 may have wavelengths in band 1 (FIG. 5) and the light from source 96 may have wavelengths in band 2. (FIG. 5). The light in band 1 and band 2 may be provided to wavelength-division-multiplexing coupler 100 or other suitable coupler using fiber 98. Coupler 100 may combine the light in bands 1 and 2 and may provide the resulting combined light at output 102 for use as Raman pump light.

If desired, the various Raman pumping schemes described above may be combined. For example, the shorter wavelength pump may be a single wavelength $\lambda_1$ in band 1, a set of pump wavelengths $\lambda_{1\text{-}1}$ to $\lambda_{1\text{-}N}$ in band 1, a broadband spectrum in band 1, or any suitable combination of these pump arrangements. The longer wavelength pump may be a single wavelength $\lambda_2$ in band 2, a set of pump wavelengths $\lambda_{2\text{-}1}$ to $\lambda_{2\text{-}N}$ in band 2, a broadband spectrum in band 2, or any suitable combination of these pump arrangements.

An illustrative example showing the type of noise figure enhancement that may be achieved using the Raman pumping scheme of pumps 46 is described in connection with FIGS. 10–12. The example of FIGS. 10–12 involves the use of a two-wavelength system ($\lambda_1$ and $\lambda_2$), but the same type of results may be obtained using multiple wavelengths or broadband pump spectra for the shorter and longer wavelength pump bands if desired.

Figure 10:
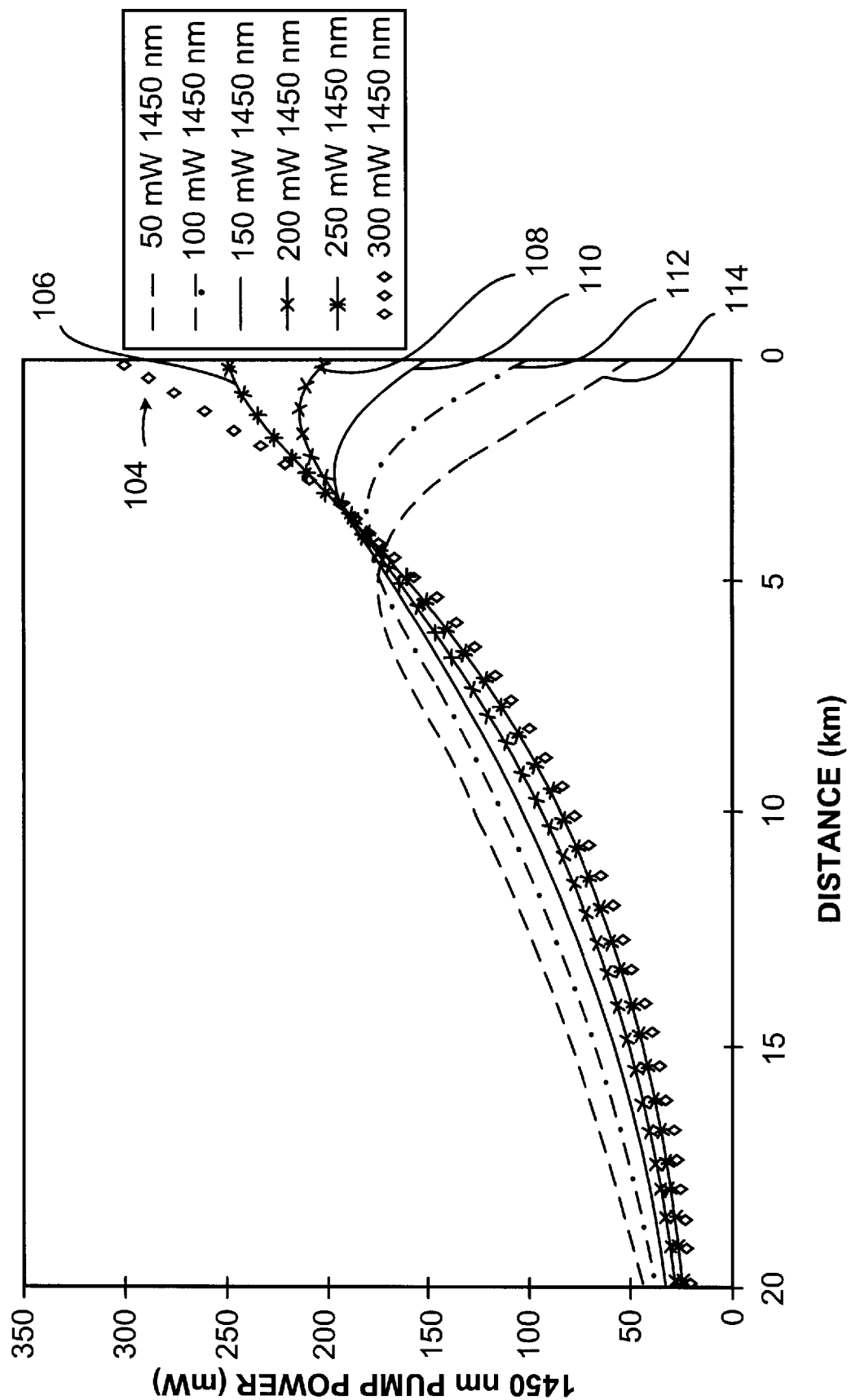
FIG. 10 is a graph showing how the penetration of Raman pump light into a fiber may be extended by Raman-pumping the Raman pump light in accordance with the present invention.

The power of the longer wavelength pump ($\lambda_2$) is plotted in FIG. 10 as a function of distance into the pumped fiber (e.g., as a function of distance towards the transmitter in a pumped fiber span 16). The distance 0 represents the launch location for the Raman pump light at both $\lambda_2$ and $\lambda_1$. The distance 20 km represents the farthest distance into the fiber towards the transmitter that is plotted in FIG. 10. The pump wavelengths in the FIG. 10 example are $\lambda_2$=1450 nm and $\lambda_2$=1350 nm. The pump at $\lambda_2$ provides Raman gain for the optical data signals being carried through the fiber in the communications network. The pump at $\lambda_1$ provides gain for the pump at $\lambda_2$ and therefore extends the distance that the pump at $\lambda_2$ penetrates into the fiber. (Although the pump power at $\lambda_2$ at the longer distances from the pump launch point is increased, there is an associated decrease in the amount of pump power in the fiber in the relatively short length of fiber immediately after the pump launch point, as shown in FIGS. 3 and 10.)

The graph of FIG. 10 contains a family of curves. The different members in the family of curves correspond to different combinations of the pump powers at $\lambda_1$ and $\lambda_2$. For example, curve 104 corresponds to a pump power of 300 mW at $\lambda_2$ and a pump power of 0 mW at $\lambda_1$. Curve 104 therefore represents the pump power profile of a conventional one-wavelength distributed Raman amplifier pumping scheme. Curve 106 corresponds to a pump power at $\lambda_2$ of 250 mW. The associated pump power at $\lambda_1$ is about 75 mW. Curves 108, 110, 112, and 114 correspond to pump configurations with decreasing amounts of pump power at $\lambda_2$ and correspondingly larger amounts of pump power at $\lambda_1$. The relationship between the pump powers at $\lambda_1$ and $\lambda_2$ was selected to produce a constant amount of Raman gain (12.8 dB) in the Raman-pumped fiber at a particular illustrative signal wavelength (1550 nm).

Figure 11:
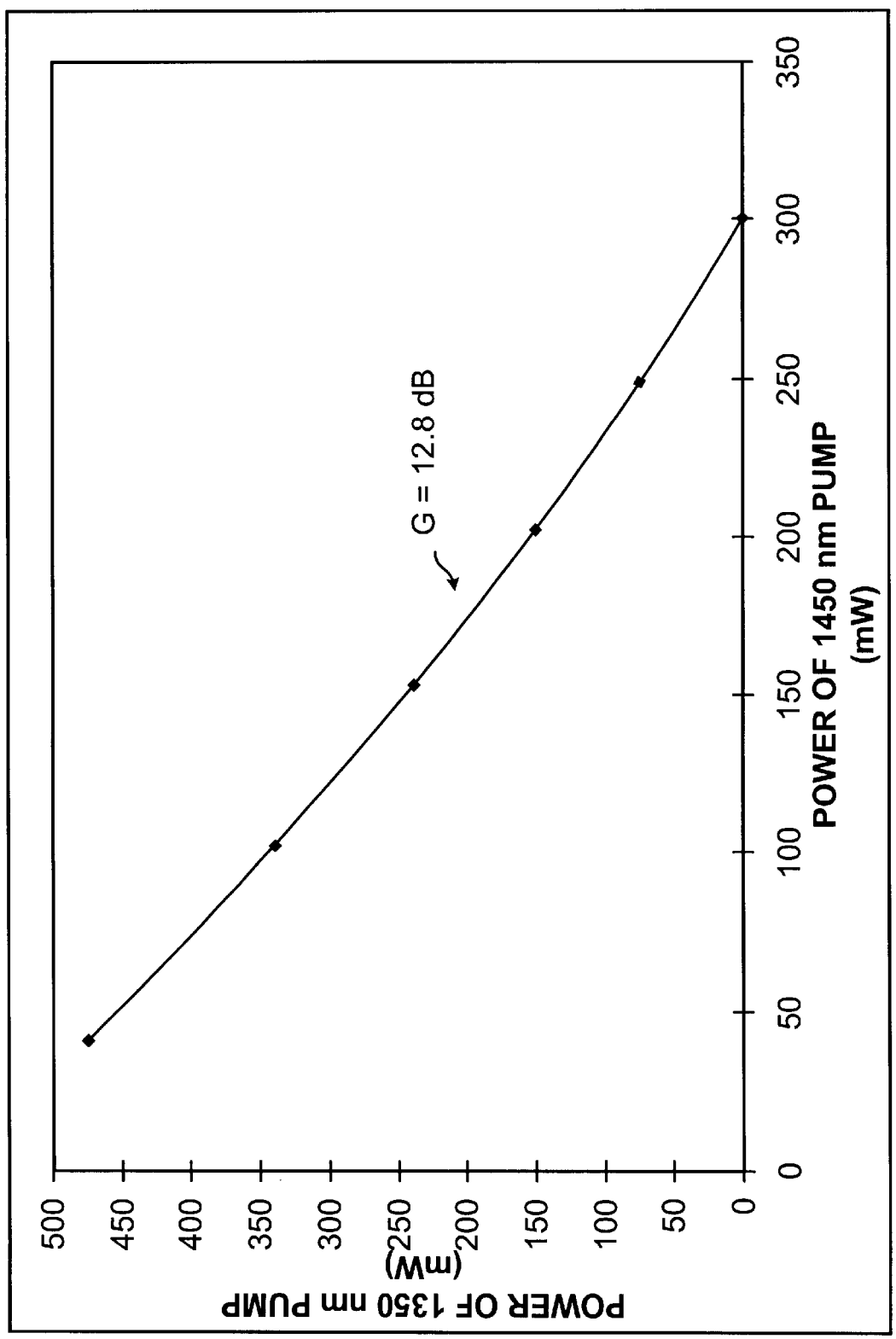
FIG. 11 is a graph showing different pump power combinations that may be used in a multiwavelength Raman pump source in accordance with the present invention.

The relative pump powers at $\lambda_1$ and $\lambda_2$ that produce this constant amount of Raman gain are plotted in FIG. 11. As shown in FIG. 11, the total pump power (the combined power of the pumps at $\lambda_1$ and $\lambda_2$) rises as the relative amount of pump power at $\lambda_1$ is increased. However, by increasing the amount of pump power at $\lambda_1$, the pump at $\lambda_2$ extends farther into the fiber, as shown in FIG. 10. The pump power at $\lambda_2$ may be considered to extend farther into the fiber because the power at $\lambda_2$ is generally higher at any given point in the fiber at which Raman gain is being produced than it would have been in the absence of supportive pumping at $\lambda_1$ (with the exception of the short distance of fiber immediately following the launch point of the pump light).

Figure 12:
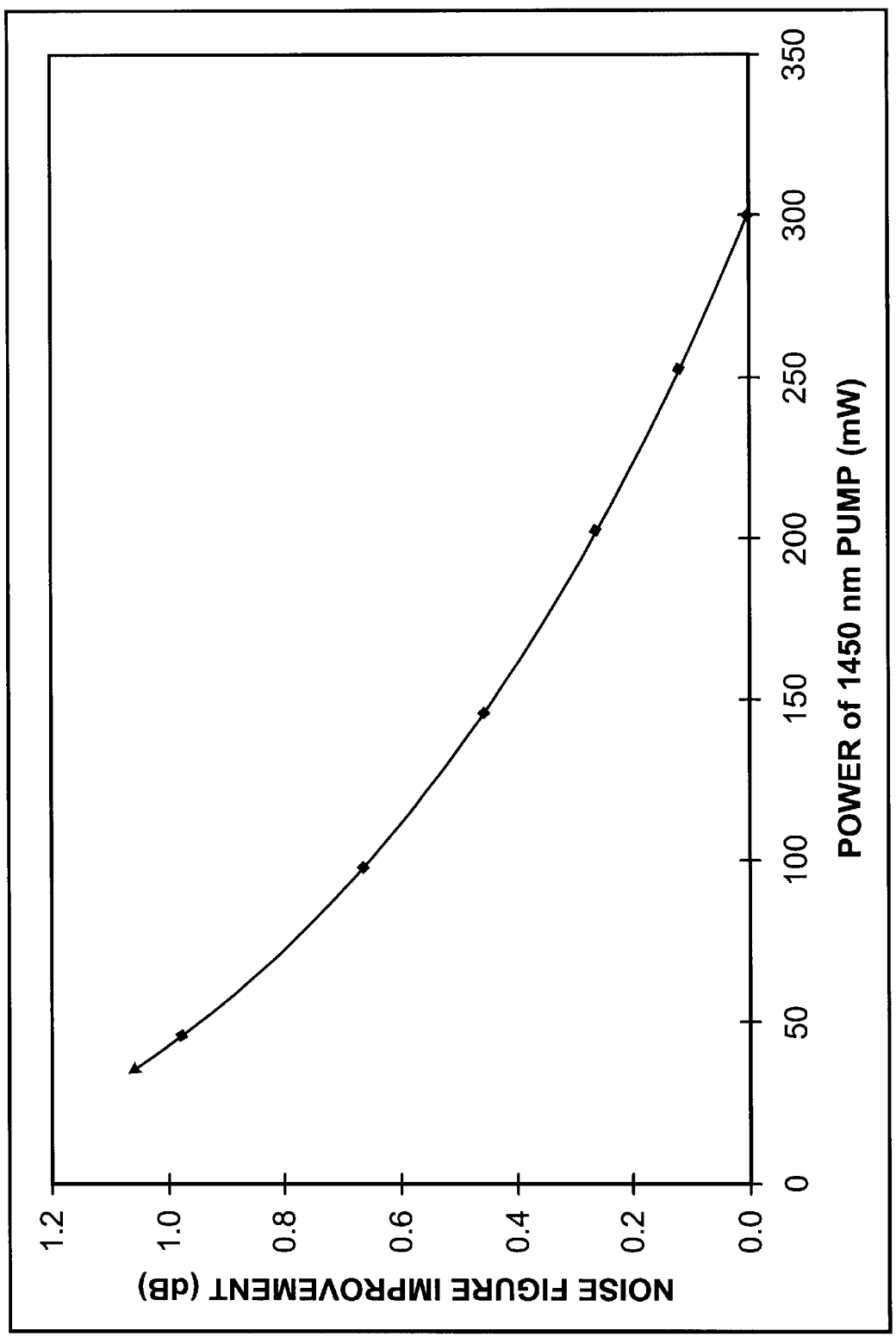
FIG. 12 is a graph showing how the noise figure of a Raman amplifier may be improved by Raman-pumping the Raman pump light that is used to produce Raman gain for the data signals being amplified by the amplifier in accordance with the present invention.

The noise figure improvement for the illustrative data channel at 1550 nm is plotted in FIG. 12 as a function of the $\lambda_2$ pump power that is used to pump the fiber. The corresponding pump powers at $\lambda_1$ are given by the curve of FIG. 11. The noise figure is improved when more pumping is provided at $\lambda_1$, because this extends the reach of pump $\lambda_2$ and therefore provides Raman gain for the data signals at an earlier stage in the fiber (e.g., at an earlier stage in fiber 16) than would otherwise be possible.

As shown by the graph of FIG. 12, the greatest noise figure improvement is exhibited when the power at $\lambda_2$ is minimized and the power at $\lambda_1$ is maximized. On the other hand, the greatest pumping efficiency occurs when $\lambda_1$ is minimized (e.g., there is no pump at $\lambda_1$). The minimum pump power at $\lambda_2$ that is plotted in FIG. 12 is 50 mW. This is, however, merely illustrative. Any suitable pump powers at $\lambda_1$ and $\lambda_2$ may be used if desired.

The pump powers of the pumps such as Raman pump 46 may be controlled in real time to prevent gain transients. In the absence of a gain transient control scheme, Raman gain transients may be produced whenever the input power to a Raman amplifier changes abruptly. The input power may change abruptly due to a fiber cut or a system reconfiguration that causes channels to be added or dropped suddenly.

One way in which to control gain transients involves measuring the total power of the optical signals being handled by a given gain stage. Signals may be monitored at the input and the output of the gain stage. If input signals are monitored, a feed-forward control approach may be used in which the pump powers are adjusted up or down in response to fluctuations in the input power. A feedback approach may also be used to control the pumps. One suitable feedback approach involves calculating the gain of the amplifier stage in real time based on the measured input and output powers. The pump power may then be controlled in real time to maintain the measured gain for the amplifier stage at a desired level.

In systems in which the gain of the amplifier stage is not flat, a spectral filter may be used on the output power optical monitor to remove the spectral dependence of the gain stage from the feedback loop. In systems in which the gain media in the amplifier has a non-flat spectral shape, a spectral filter may also be used to filter the input power measurements. This type of spectral filter may be configured to have a transmission spectrum with a shape that matches the shape of the gain spectrum of the gain medium. Using an input filter of this type may help to improve the accuracy of the feed-forward contribution to the pump power control scheme.

These control schemes may be used in rare-earth-doped fiber amplifiers and Raman amplifier systems in which a discrete coil or coils of fiber are pumped using one or more Raman pumps such as pumps 46.

Figure 13:
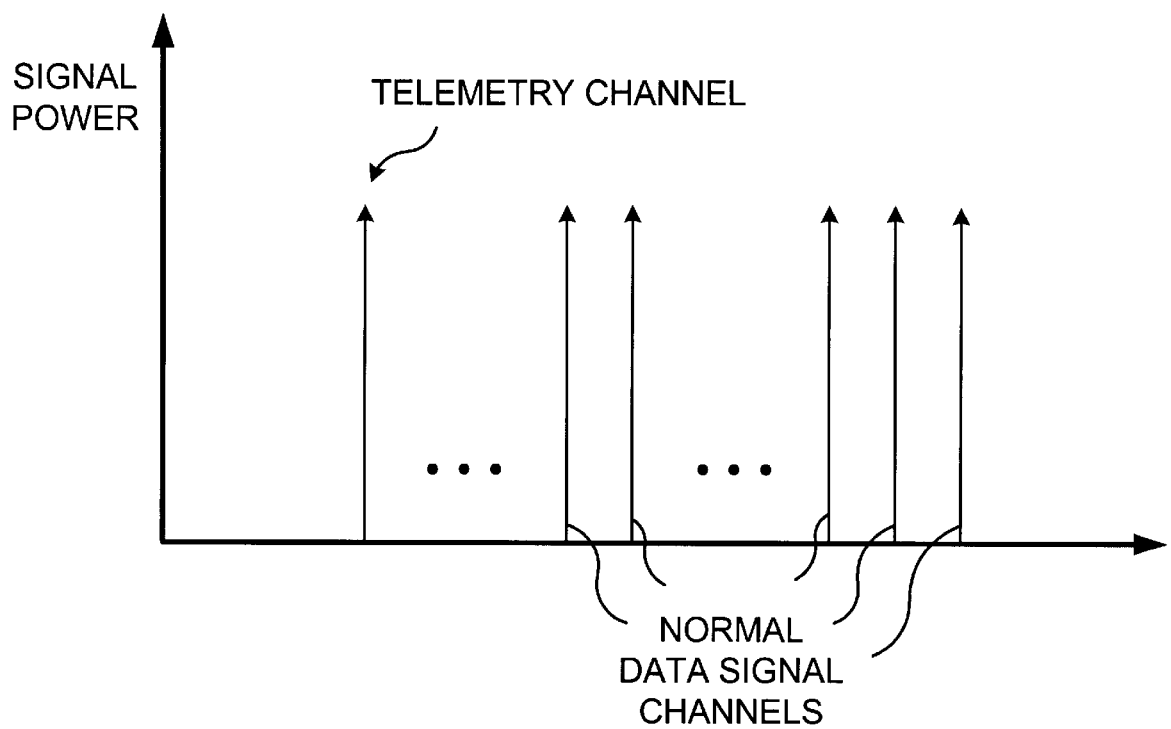
FIG. 13 is a graph showing the location of an illustrative telemetry channel that may be monitored when gathering information for controlling gain transients in a Raman amplifier in accordance with the present invention.

Feedback control schemes may be used to control the pump power used to pump a distributed Raman amplifier stage. A monitor or monitors may be used to measure the output power of a Raman-pumped fiber span at a particular wavelength. The wavelength of the channel that is monitored may be selected to correspond to a channel that is guaranteed to be present. The guaranteed channel may be, for example, the service channel or telemetry channel, in the system. The telemetry channel or other suitable channel may be located at the end of the normal signal band, as shown in FIG. 13, or may be located at any other suitable wavelength.

The network maintainer may ensure that the monitored channel is always present when the network is operating properly. Because the Raman gain experienced by the monitored channel is generally representative of the total Raman gain on the fiber, the power of the monitored channel may be used as an indicator power. When the monitored channel power drops, the pump power may be increased. When the monitored channel power rises, the pump power may be decreased. This type of feedback approach prevents Raman gain transients in the distributed Raman amplifiers formed by pump equipment 20 and transmission fiber spans 16 of FIG. 1.

Figure 14:
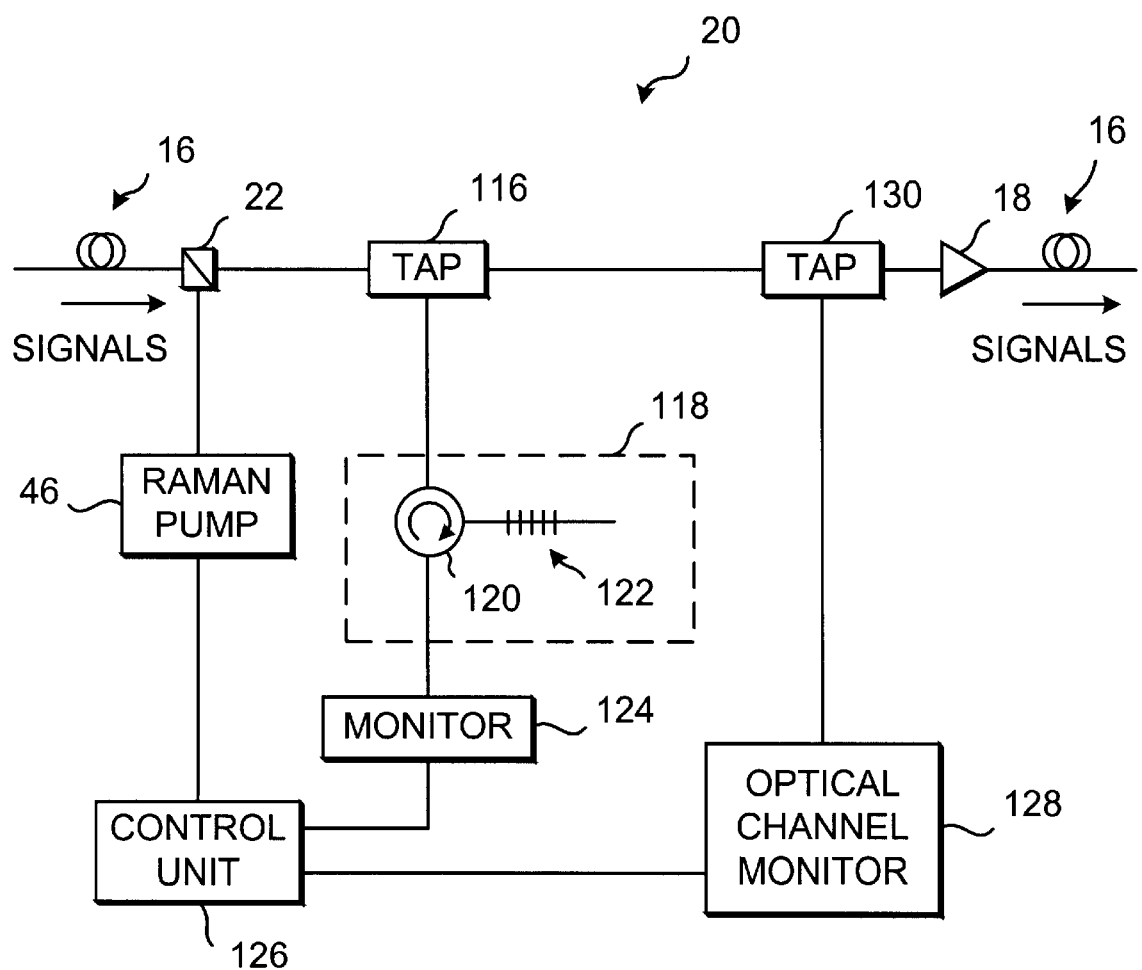
FIG. 14 is a schematic diagram of illustrative Raman pump equipment for a distributed Raman amplifier having gain transient control capabilities in accordance with the present invention.

Illustrative Raman pump equipment 20 that may be used to support this type of transient control scheme is shown in FIG. 14. Equipment 20 of FIG. 14 may be stand-alone equipment or may be formed as part of an amplifier 18. Signals on the data channels carried on span 16 may be tapped using optical tap 116. Tap 116 may be, for example, a wavelength-insensitive 2%/98% tap. The tapped-signals may be optically filtered using filter 118. The illustrative filter 118 that is shown in FIG. 14 is based on a circulator 120 and a reflector 122 such as a fiber Bragg grating. Any suitable filter arrangement may be used if desired.

Filter 118 may be used to filter the service channel or other guaranteed channel from the other channels present on link 10. The power of the filtered channel may be monitored using monitor 124. Monitor 124 may be based on a photodetector or other suitable optical monitor.

Control unit 126 may use information from monitor 124 to control the operation of Raman pump 46. In particular, control unit 126 may adjust the power of pump 46 up or down as needed to maintain the measured power of the filtered channel at a constant level. This approach suppresses Raman gain transients. Control unit 126 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

If desired, a multiwavelength optical channel monitor 128 may be used to monitor the signals on link 10. Signals received from span 16 may be tapped using optical tap 130. Optical channel monitor 128 may analyze the signals to determine which, if any, channels are presently operating on link 10. The power of one or more of the channels that are present may then be monitored. A feedback control loop may be implemented using control unit 126. This allows the pump power produced by Raman pump 46 to be controlled in real time to suppress gain transients based on the monitored optical power of the channels that have been determined to be present.

Figure 15:
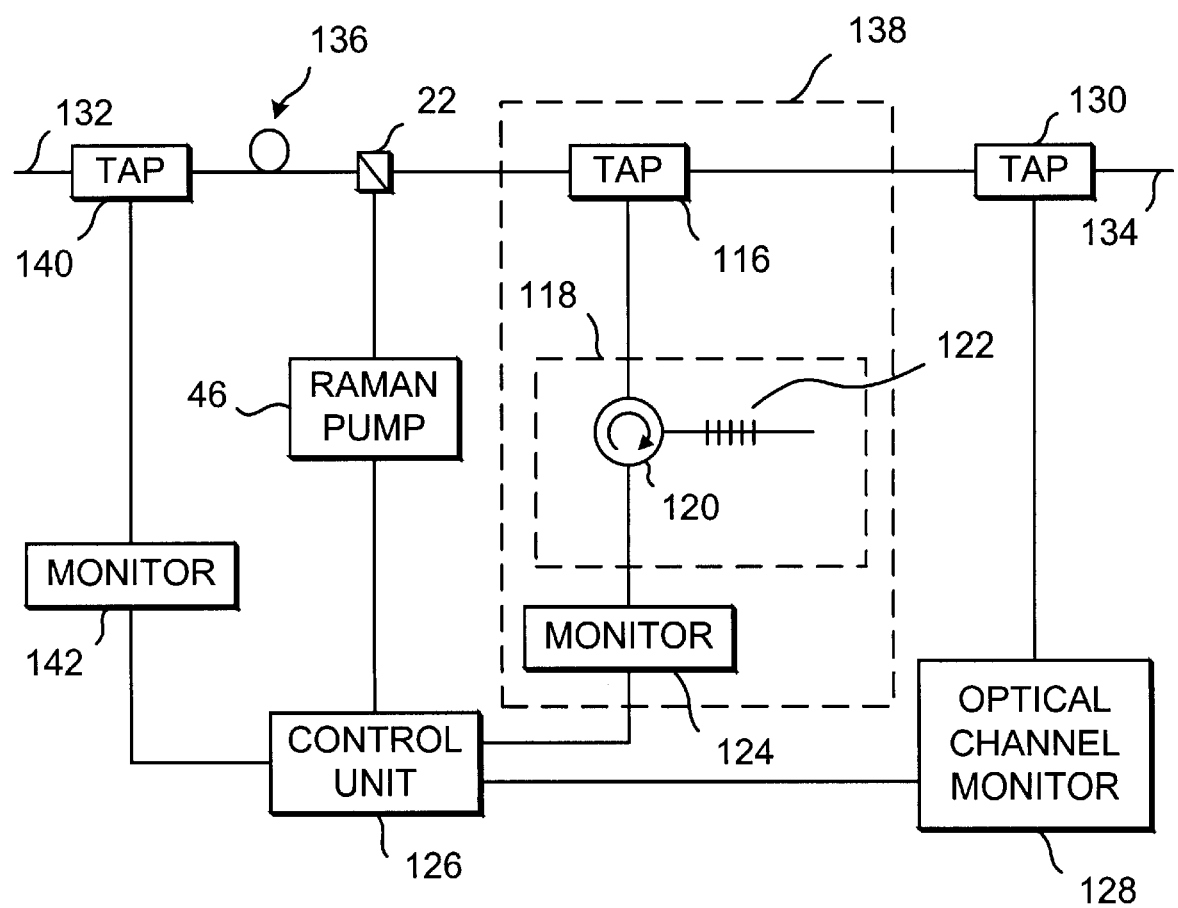
FIG. 15 is a schematic diagram of an illustrative Raman amplifier based on a discrete coil of Raman-pumped fiber having gain transient control capabilities in accordance with the present invention.

A discrete Raman amplifier arrangement with gain transient control capabilities is shown in FIG. 15. Input signals (e.g., from a span of transmission fiber 16) may be received at fiber input 132. Corresponding amplified output signals may be provided at fiber output 134. Optical gain may be provided by fiber 136. Fiber 136 may be dispersion-compensating fiber or small-core-area-fiber or other suitable fiber for producing Raman gain. Fiber 136 may be Raman pumped by Raman pump light that is produced by Raman pump 46 and coupled into fiber 136 through pump coupler 22.

Control unit 126 may use optical monitoring components and circuitry 138 such as tap 116, filter 118, and monitor 124 to monitor the power of the data signals on a particular channel or channels (e.g., a channel that is guaranteed to be present such as the telemetry channel or other suitable channel). The measured power of the tapped and filtered channel may be used in a feedback control loop to control the pump power that is produced by Raman pump 46.

If desired, tap 130 and optical channel monitor 128 may be used to identify which channels are present on the link 10. The power of one or more of the channels that are present may be maintained at a desired level by controlling the power of pump 46 using feedback.

An input tap 140 and input power monitor 142 may be used to measure the total input power provided at input 132. When the input power fluctuates suddenly (e.g., due to a channel add or drop event), control unit 126 may use the power measurements from monitor 142 to calculate an appropriate feed-forward power adjustment for pump 46.

Feed-forward and feedback control techniques may be combined if desired. With a hybrid control approach, feed-forward contributions to the control algorithm that are based on the input power measured using monitor 142 may be combined with feedback contributions to the control algorithm. Feedback contributions may be provided using any suitable feedback technique. For example, the output power or Raman gain of coil 136 may be monitored on a particular channel using filter 118 and monitor 124. Feedback may be used to help maintain the power of the particular channel at a constant level. Another feedback approach involves monitoring the total gain of coil 136 (e.g., using an input tap and monitor such as tap 140 and monitor 142 and a corresponding output tap and monitor). With this type of approach, spectral filters may be used to ensure that the spectral response of the optical monitoring system matches the overall gain spectrum of coil 136. Another feedback approach involves using optical channel monitor. 128 to detect which channel or channels are operating on link 10. The power of a given one or more of these active channels may then be monitored in real time while pump 46 is adjusted to ensure that the power of the given channel is maintained at a constant level. These are merely illustrative examples. Any suitable control scheme may be used to control the Raman pump 46 to ensure that the appropriate pump power is used.

When the pump power of pump 46 is adjusted, the ratio of the pump powers at $\lambda_1$ and $\lambda_2$ (or the comparable powers of the light in bands 1 and 2 in a multiwavelength or broadband arrangement) may be maintained at a relatively fixed level or may be varied.

It will be understood that the foregoing is merely illustrative of the principles of this invention, and that various modifications can be made by those skilled in the art without departing from the scope and spirit of the invention.

What is claimed is:

1. Apparatus for amplifying optical signals in a wavelength-division-multiplexing fiber-optic communications link including optical fiber on which a plurality of channels at different wavelengths are carried, comprising:
    a first Raman pump that produces pump light for the optical fiber at a first wavelength;
    a second Raman pump that produces pump light for the optical fiber at a second wavelength, wherein the pump light at the first wavelength propagates in the same direction in the optical fiber as the pump light at the second wavelength, wherein the pump light at the second wavelength is located at a wavelength that is a Stokes shift shorter than at least some of the wavelengths of the channels so that the pump light at the second wavelength produces Raman gain for the channels, and wherein the pump light at the first wavelength is located at a wavelength that is a Stokes shift shorter than the second wavelength so that the pump light at the first wavelength produces Raman gain for the pump light at the second wavelength;
    an optical monitor that monitors the optical signals on the link; and
    a control unit that receives information on the monitored optical signals from the optical monitor, wherein the control unit uses the information to control at least the second Raman pump to prevent Raman gain transients in the optical fiber due to fluctuations in the optical signals.

2. Apparatus for amplifying optical signals in a wavelength-division-multiplexing fiber-optic communications link including optical fiber on which a plurality of channels at different wavelengths are carried, comprising:
    a first Raman pump that produces pump light for the optical fiber at a first wavelength;
    a second Raman pump that produces pump light for the optical fiber at a second wavelength, wherein the pump light at the first wavelength propagates in the same direction in the optical fiber as the pump light at the second wavelength, wherein the pump light at the second wavelength is located at a wavelength that is a Stokes shift shorter than at least some of the wavelengths of the channels so that the pump light at the second wavelength produces Raman gain for the channels, and wherein the pump light at the first wavelength is located at a wavelength that is a Stokes shift shorter than the second wavelength so that the pump light at the first wavelength produces Raman gain for the pump light at the second wavelength;
    an optical monitor that monitors the optical signals on the link; and
    a control unit that receives information on the monitored optical signals from the optical monitor, wherein the control unit uses the information to control at least the first Raman pump to prevent Raman gain transients in the optical fiber due to fluctuations in the optical signals.

3. Apparatus for amplifying optical signals in a wavelength-division-multiplexing fiber-optic communications link including optical fiber on which a plurality of channels at different wavelengths are carried, comprising:
    a first Raman pump that produces pump light for the optical fiber at a first wavelength;
    a second Raman pump that produces pump light for the optical fiber at a second wavelength, wherein the pump light at the first wavelength propagates in the same direction in the optical fiber as the pump light at the second wavelength, wherein the pump light at the second wavelength is located at a wavelength that is a Stokes shift shorter than at least some of the wavelengths of the channels so that the pump light at the second wavelength produces Raman gain for the channels, and wherein the pump light at the first wavelength is located at a wavelength that is a Stokes shift shorter than the second wavelength so that the pump light at the first wavelength produces Raman gain for the pump light at the second wavelength;
    a filter that filters out light from the optical fiber on an active channel;

an optical monitor that measures the filtered light on the active channel; and a control unit that receives information on the measured filtered light from the optical monitor and that uses the information to control at least the first Raman pump to prevent Raman gain transients in the optical fiber.

4. Apparatus for amplifying optical signals in a wavelength-division-multiplexing fiber-optic communications link including optical fiber on which a plurality of channels at different wavelengths are carried, comprising:

a first Raman pump that produces pump light for the optical fiber at a first wavelength;

a second Raman pump that produces pump light for the optical fiber at a second wavelength, wherein the pump light at the first wavelength propagates in the same direction in the optical fiber as the pump light at the second wavelength, wherein the pump light at the second wavelength is located at a wavelength that is a Stokes shift shorter than at least some of the wavelengths of the channels so that the pump light at the second wavelength produces Raman gain for the channels, and wherein the pump light at the first wavelength is located at a wavelength that is a Stokes shift shorter than the second wavelength so that the pump light at the first wavelength produces Raman gain for the pump light at the second wavelength;

a filter that filters out light from the optical fiber on an active channel;

an optical monitor that measures the filtered light on the active channel; and a control unit that receives information on the measured filtered light from the optical monitor and that uses the information to control at least the second Raman pump to prevent Raman gain transients in the optical fiber.

* * * * *